US010697241B2

(12) United States Patent
Chambers et al.

(10) Patent No.: US 10,697,241 B2
(45) Date of Patent: Jun. 30, 2020

(54) DOWNHOLE TURBINE WITH AN ADJUSTABLE SHROUD (71) Applicant: Halliburton Energy Services, Inc., Houston, TX (US)

(72) Inventors: Larry DeLynn Chambers, Kingwood, TX (US); Joe Marzouk, Conroe, TX (US); Olumide O. Odegbami, Houston, TX (US); Mukul M. Agnihotri, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 208 days.

(21) Appl. No.: 15/753,433

(22) PCT Filed: Oct. 28, 2015

(86) PCT No.: PCT/US2015/057809
§ 371 (c)(1),
(2) Date: Feb. 19, 2018

(87) PCT Pub. No.: WO2017/074352
PCT Pub. Date: May 4, 2017

(65) Prior Publication Data
US 2018/0245403 A1 Aug. 30, 2018

(51) Int. Cl.
E21B 4/02 (2006.01)
H02K 7/18 (2006.01)
(Continued)

(52) U.S. Cl.
CPC ............... *E21B 4/02* (2013.01); *F03B 13/02* (2013.01); *H02K 7/1823* (2013.01);
(Continued)

(58) Field of Classification Search
CPC ...... E21B 4/02; E21B 43/129; E21B 41/0085; F03B 13/02; F03B 15/04; F01D 11/14;
(Continued)

(56) References Cited

U.S. PATENT DOCUMENTS 3,227,418 A * 1/1966 West .................. F01D 11/22
415/127
3,520,635 A * 7/1970 Ivanko .................. F01D 11/18
415/138
(Continued)

FOREIGN PATENT DOCUMENTS

GB 2024336 A * 1/1980 .............. F01D 11/22
WO 2007-146889 A2 12/2007
(Continued)

OTHER PUBLICATIONS

International Search Report and Written Opinion for International Application PCT/US2015/057809 issued by the Korean Intellectual Property Office dated Jul. 27, 2016, 16 pages.

*Primary Examiner* — Ninh H. Nguyen
*Assistant Examiner* — Behnoush Haghighian
(74) *Attorney, Agent, or Firm* — Haynes and Boone, LLP (57) ABSTRACT A method and apparatus according to which an output of a power generation system is controlled. In one embodiment, the power generation system includes a turbine and a feedback control system. The turbine includes a rotor to which a first portion of a power fluid is communicated, the first portion imparting torque to the rotor; a shaft to which the rotor is connected; a shroud extending circumferentially about the rotor and the shaft; and a bypass gap between the rotor and the shroud, through which a second portion of the power fluid is communicated. The feedback control system axially displaces the shroud relative to the rotor, thereby (Continued)

adjusting the size of the bypass gap and, consequently, the ratio of the first portion relative to the second portion.

19 Claims, 9 Drawing Sheets

(51) Int. Cl.
  *F03B 13/02* (2006.01)
  *F01D 11/20* (2006.01)
  *E21B 41/00* (2006.01)
  *F04D 29/62* (2006.01)
  *F01D 11/22* (2006.01)
  *F01D 11/24* (2006.01)

(52) U.S. Cl.
  CPC ............ *E21B 41/0085* (2013.01); *F01D 11/20* (2013.01); *F01D 11/22* (2013.01); *F01D 11/24* (2013.01); *F04D 29/622* (2013.01); *F05B 2250/02* (2013.01); *F05B 2270/1033* (2013.01); *F05D 2240/11* (2013.01)

(58) Field of Classification Search
  CPC .......... F01D 11/20; F01D 11/22; F01D 17/10; F01D 17/105; F01D 17/14; F01D 17/141; F01D 5/08; F05D 2250/90; F05D 2260/606
  USPC ............................................. 415/145; 175/107
  See application file for complete search history.

(56) References Cited

U.S. PATENT DOCUMENTS

| | | | |
|---|---|---|---|
| 4,330,234 A * | 5/1982 | Colley | F01D 11/22 415/127 |
| 5,203,673 A * | 4/1993 | Evans | F01D 11/22 415/10 |
| 5,263,319 A | 11/1993 | By et al. | |
| 6,279,651 B1 * | 8/2001 | Schwendemann | E21B 41/0035 166/54.1 |
| 6,607,350 B2 * | 8/2003 | Dodd | F01D 11/22 415/126 |
| 7,549,835 B2 * | 6/2009 | Brillert | F04D 29/164 277/413 |
| 8,133,003 B2 * | 3/2012 | Davi | F01D 11/20 277/303 |
| 8,177,476 B2 * | 5/2012 | Andrew | F01D 11/20 415/1 |
| 8,267,196 B2 | 9/2012 | Hall et al. | |
| 8,297,375 B2 | 10/2012 | Hall et al. | |
| 8,408,336 B2 | 4/2013 | Hall et al. | |
| 8,939,715 B2 * | 1/2015 | Miller | F01D 11/24 415/131 |
| 9,200,529 B2 * | 12/2015 | Buchal | F01D 11/14 |
| 9,567,865 B2 * | 2/2017 | Jalbert | F01D 11/16 |
| 9,840,932 B2 * | 12/2017 | Ballard, Jr. | F01D 11/24 |
| 9,840,933 B2 * | 12/2017 | Chochua | F01D 17/10 |
| 10,302,083 B2 * | 5/2019 | Downton | E21B 4/02 |
| 10,309,409 B2 * | 6/2019 | Nesteroff | F04D 29/162 |
| 10,309,410 B2 * | 6/2019 | Ottow | F04D 29/162 |
| 10,323,536 B2 * | 6/2019 | Hill | F04D 29/642 |
| 10,352,329 B2 * | 7/2019 | Nesteroff | F01D 11/24 |
| 10,364,694 B2 * | 7/2019 | Ribarov | F01D 5/12 |
| 10,408,226 B2 * | 9/2019 | Ottow | F04D 29/4206 |
| 10,458,429 B2 * | 10/2019 | Nesteroff | F02C 3/08 |
| 2002/0155003 A1 | 10/2002 | Zupanick et al. | |
| 2003/0012644 A1 * | 1/2003 | Dodd | F01D 11/22 415/173.1 |
| 2008/0063513 A1 * | 3/2008 | Afanasiev | F01D 11/22 415/138 |
| 2009/0095528 A1 | 4/2009 | Hay et al. | |
| 2010/0116551 A1 | 5/2010 | Southard | |
| 2011/0229301 A1 * | 9/2011 | Miller | F01D 11/22 415/1 |
| 2013/0028716 A1 | 1/2013 | Bouru et al. | |
| 2013/0315716 A1 * | 11/2013 | Cotroneo | F01D 11/22 415/130 |
| 2015/0167488 A1 * | 6/2015 | Orosa | F01D 11/22 415/173.2 |
| 2016/0102499 A1 * | 4/2016 | Stewart | F03B 13/02 415/1 |
| 2016/0177773 A1 * | 6/2016 | Chochua | F01D 17/10 415/148 |
| 2016/0195087 A1 * | 7/2016 | Downton | E21B 4/02 175/57 |
| 2016/0298483 A1 * | 10/2016 | Hill | F04D 29/642 |
| 2016/0312645 A1 * | 10/2016 | Ribarov | F01D 11/22 |
| 2017/0175750 A1 * | 6/2017 | McManus | F04D 19/02 |
| 2017/0342996 A1 * | 11/2017 | Nesteroff | F04D 29/162 |
| 2019/0323514 A1 * | 10/2019 | Nesteroff | F01D 11/24 |

FOREIGN PATENT DOCUMENTS

| | | |
|---|---|---|
| WO | 2014-099783 A1 | 6/2014 |
| WO | 2014-174315 A2 | 10/2014 |

\* cited by examiner

DOWNHOLE TURBINE WITH AN ADJUSTABLE SHROUD

TECHNICAL FIELD

The present disclosure relates generally to well drilling operations and, more specifically, to enhancing the performance of a downhole turbine by providing an adjustable shroud to control fluid flow through the turbine.

BACKGROUND

In oil or gas operations, such as drilling and/or artificial lift, a turbine may be run downhole on a tubing string to power one or more well tools. The turbine includes a rotor. Torque is imparted to the rotor when a power fluid such as, for example, a drilling fluid, is communicated to the rotor. The rotor is connected to a shaft. Torque is transferred from the rotor to the shaft during operation of the turbine. The rotor includes a plurality of blades interposed with a corresponding plurality of flow channels, through which the power fluid flows when the power fluid is communicated to the rotor. Each of the plurality of blades defines a pitch that alters the flow of the power fluid as the power fluid flows through the plurality of channels, thereby imparting torque to the rotor.

It is possible to adjust the amount of torque imparted to the rotor to accommodate overspeed or stall conditions experienced by the rotor, varying flow rates of the power fluid, and/or varying power requirements of the one or more well tools. A variable pitch rotor, which may include a motor, is sometimes used to adjust the amount of torque imparted to the rotor at a given flow rate of the power fluid. However, variable pitch rotors have a substantial number of moving parts, which parts are prone to erosion when the power fluid is communicated to the rotor. Further, variable pitch rotors can only accommodate a limited range of flow rates of the power fluid without reaching overspeed or stall conditions.

Therefore, what is needed is an apparatus, system, or method that addresses one or more of the foregoing issues, among one or more other issues.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Illustrative embodiments and related methods of the present disclosure are described below as they might be employed in downhole turbine with an adjustable shroud. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

The following disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the exemplary term "below" may encompass both an orientation of above and below. The apparatus may be otherwise oriented (rotated 90 degrees or at other orientations) and the spatially relative descriptors used herein may likewise be interpreted accordingly.

Figure 1:
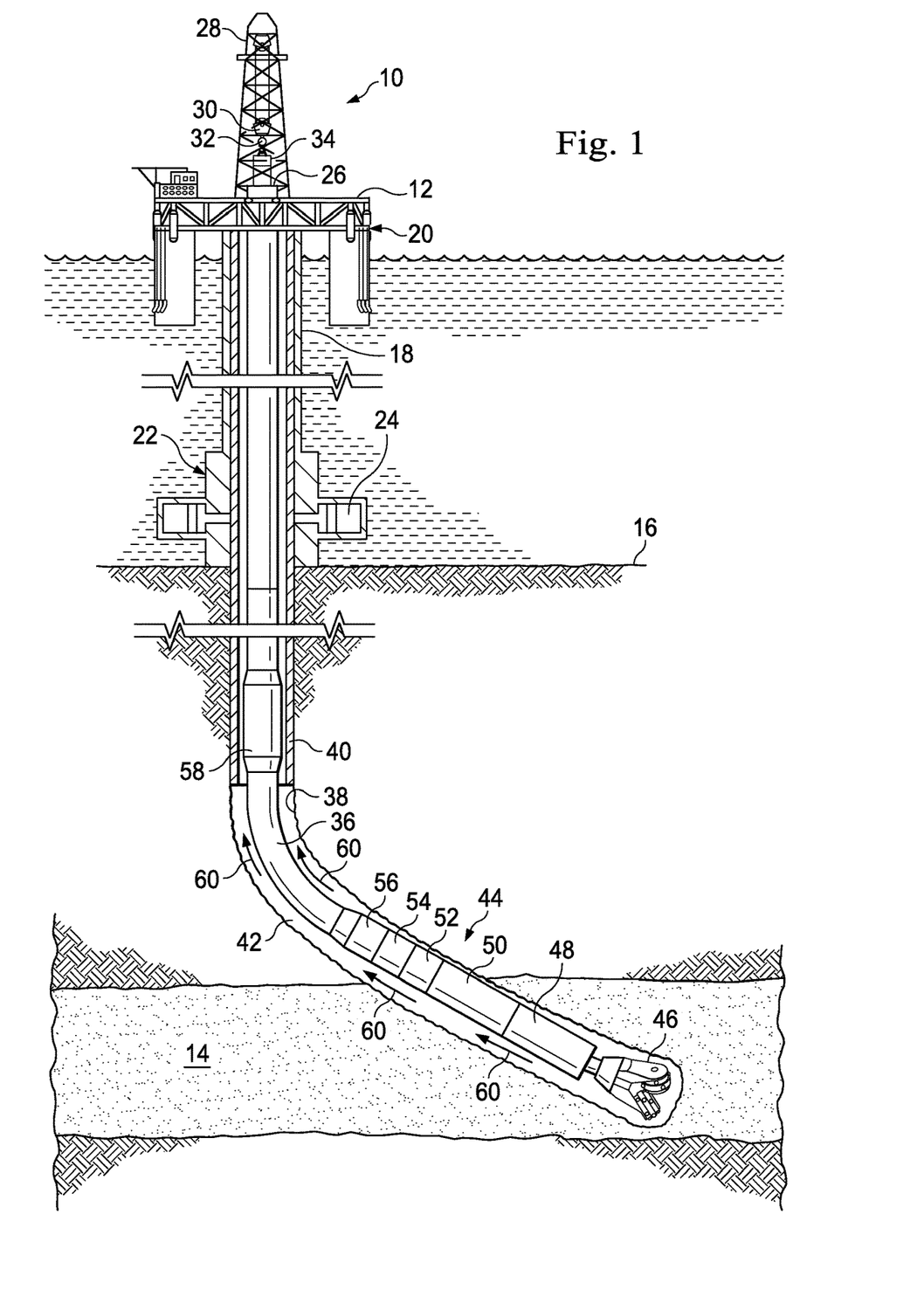
FIG. 1 is a schematic illustration of an offshore oil and gas platform operably coupled to a bottom-hole assembly disposed within a wellbore, the bottom-hole assembly including a power generation section, according to an exemplary embodiment.

In an exemplary embodiment, as illustrated in FIG. 1, an offshore oil or gas platform is schematically illustrated and generally designated by the reference numeral 10. A semi-submersible platform 12 is positioned over a submerged oil and gas formation 14 located below a sea floor 16. A subsea conduit 18 extends from a deck 20 of the platform 12 to a subsea wellhead installation 22, which includes blowout preventers 24. The platform 12 has a hoisting apparatus 26, a derrick 28, a travel block 30, a hook 32, and a swivel 34 for raising and lowering pipe strings, such as a substantially tubular, axially extending drill string 36. A wellbore 38 extends through the various earth strata, including the formation 14. The wellbore 38 includes a casing string 40 cemented in a portion thereof. An annulus 42 is defined between the wellbore 38 and the drill string 36. A bottom-hole assembly 44 is connected at the lower end portion of the drill string 36 and extends within the wellbore 38. In an exemplary embodiment, the bottom-hole assembly 44 includes a rotary drill bit 46, a rotary steerable drilling tool 48, mud motor 50, one or more logging tools 52, a telemetry system 54, and a power generation system 56. In several exemplary embodiments, the bottom-hole assembly 44 also includes other components such as, for example, drill collars, heavy-weight drill pipe, stabilizers, reamers, jarring devices, hole-openers, crossovers for various threadforms, or any combination thereof.

In an exemplary embodiment, with continuing reference to FIG. 1, the rotary steerable drilling tool 48 supports the rotary drill bit 46 during drilling operations to drill directionally through the various earth strata, including the formation 14. One or more drill collars 58 are connected at intervals within the drill string 36. The drill collars 58 apply weight on the rotary drill bit 46 through the drill string 36 during drilling operations (referred to as "weight-on-bit"). In an exemplary embodiment, the wellbore 38 is drilled by rotating the drill string 36 via a rotary table or top-drive (not shown) while applying weight-on-bit to the bottom-hole assembly 44, thereby rotating the rotary drill bit 46 against the bottom of the wellbore 38. The rotary steerable drilling tool 48 is capable of controlling the angle and azimuth of the rotary drill bit 46 relative to the wellbore 38 during drilling operations, thereby enabling directional-drilling of the wellbore 38. As the rotary drill bit 46 rotates against the bottom of the wellbore 38, a drilling fluid 60 is circulated from the surface, through the drill string 36 and the bottom-hole assembly 44, and into the wellbore 38. The drilling fluid 60 flows into the wellbore 38 through jets (not shown) in the rotary drill bit 46, thereby clearing away drill cuttings (not shown) from the rotary drill bit 46 and carrying the drill cuttings to the surface through the annulus 42.

In an exemplary embodiment, with continuing reference to FIG. 1, the mud motor 50 includes a rotor (not shown) that is operably coupled to the rotary drill bit 46. As the drilling fluid 60 is circulated through the drill string 36, the bottom-hole assembly 44, and the annulus 42 during drilling operations, the drilling fluid 60 imparts rotation to the rotor of the mud motor 50, which rotor, in turn, drives the rotary drill bit 46. In this manner, the mud motor 50 is utilized to increase the rotational speed of the rotary drill bit 46 above the rotational speed applied to the drill string 36 by the rotary table or top-drive (not shown). Although FIG. 1 depicts the mud motor 50 located above the rotary steerable drilling tool 48 in the bottom-hole assembly 44, the mud motor 50 may alternately be located elsewhere in the bottom-hole assembly 44. Alternatively, the mud motor 50 may be omitted from the bottom-hole assembly 44.

In an exemplary embodiment, with continuing reference to FIG. 1, the logging tools 52 include, but are not limited to, measurements-while-drilling ("MWD") tools and/or logging-while-drilling ("LWD") tools. The MWD tools measure the physical properties of the wellbore 38 during drilling operations, such as, for example, pressure, temperature, and wellbore trajectory in three-dimensional space. The MWD tools are capable of establishing the depth, bottom-hole location, and orientation of the rotary steerable drilling tool 48 and the bottom-hole assembly 44. Further, the MWD tools provide a range of measurements of the drill string 36, the bottom-hole assembly 44, and the wellbore 38, including, but not limited to: forces acting on the drill string 36 and the bottom-hole assembly 44; static and dynamic pressures within the drill string 36 and the annulus 42; and the size and shape of the wellbore 38. In contrast, the LWD tools are adapted to measure the physical properties of the formation 14 during drilling operations. The LWD tools are capable of a variety of logging operations such as, for example, density logging, gamma ray logging, resistivity logging, and sonic velocity logging, among others. These logging operations are utilized to determine a range of geological characteristics including, but not limited to, the density, porosity, resistivity, and lithology of the various earth strata and the formation 14. Although FIG. 1 depicts the logging tools 52 located above the rotary steerable drilling tool 48 and the mud motor 50 in the bottom-hole assembly 44, the logging tools 52 may alternately be located elsewhere in the bottom-hole assembly 44. Alternatively, the logging tools 52 may be omitted from the bottom-hole assembly 44.

In an exemplary embodiment, with continuing reference to FIG. 1, the telemetry system 54 is adapted to convert measurements received from the logging tools 52 during drilling operations into signals that are suitable for transmission from the wellbore 38 to the surface. Further, the telemetry system 54 is adapted to receive transmissions from the surface during drilling operations. The telemetry system 54 is capable of making and receiving transmissions using a number of telemetry tools such as, for example, a mud pulse telemetry tool and/or an electromagnetic telemetry tool, among others. A mud pulse telemetry tool uses valves to modulate the flow of the drilling fluid 60 in the drill string 36, generating pressure pulses that propagate up the column of drilling fluid 60 inside the drill string 36 and are detected by pressure transducers at the surface. An electromagnetic telemetry tool transmits data via low-frequency electromagnetic waves that propagate through the earth and are detected by a grounded antenna at the surface. Although FIG. 1 depicts the telemetry system 54 located above the rotary steerable drilling tool 48, the mud motor 50, and the logging tools 52 in the bottom-hole assembly 44, the telemetry system 54 may alternately be located elsewhere in the bottom-hole assembly 44. Alternatively, the telemetry system 54 may be omitted from the bottom-hole assembly 44.

Figure 2A:
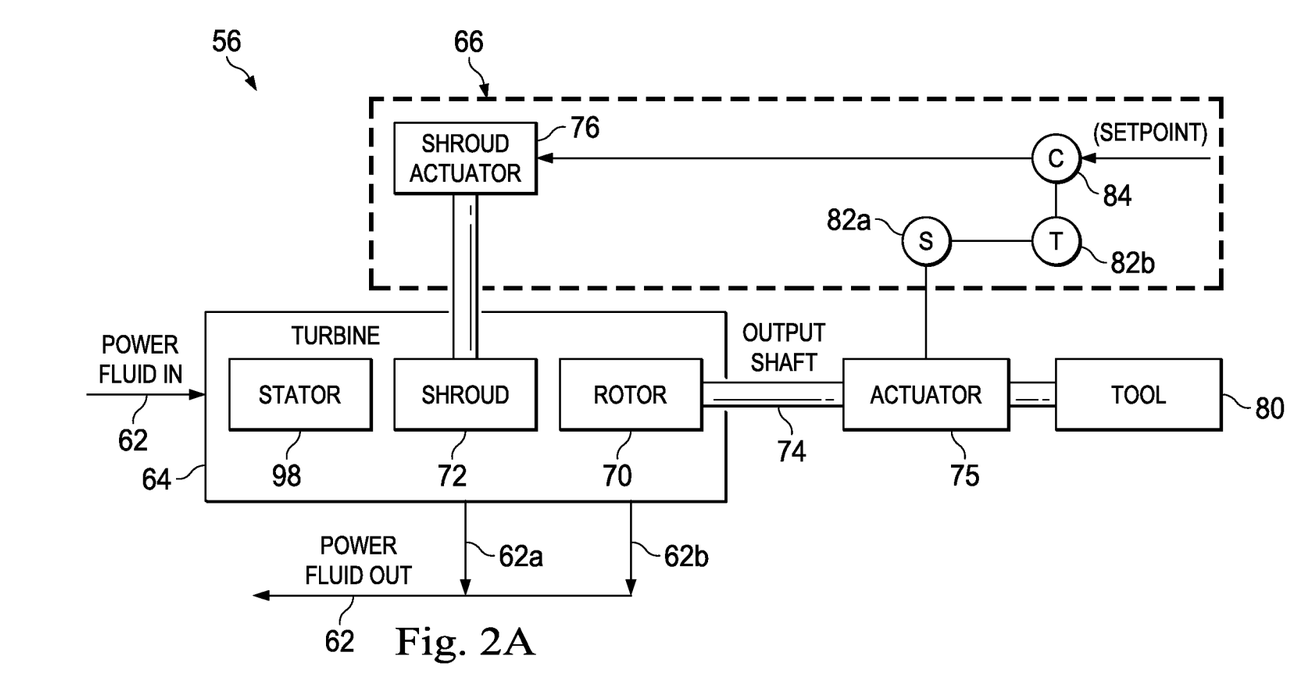
FIG. 2A is a block diagram of the power generation system of FIG. 1, the power generation system including a turbine, an actuator, and a feedback control loop, according to an exemplary embodiment.

In an exemplary embodiment, with continuing reference to FIG. 1, the power generation system 56 is adapted to provide mechanical, hydraulic, and/or electric power to the various components of the bottom-hole assembly 44, which components include, but are not limited to, the rotary drill bit 46, the rotary steerable drilling tool 48, the mud motor 50, the logging tools 52, and/or the telemetry system 54. In several exemplary embodiments, the power generation system 56 also provides power to other components of the bottom-hole assembly 44 such as, for example, stabilizers, reamers, jarring devices, and/or hole-openers. The power generation system 56 converts the flow of a power fluid 62 (shown in FIG. 2) into mechanical power that is output from the power generation system 56 via torque, which torque can then be converted into hydraulic and/or electric power. The power fluid 62 is communicated to the power generation system 56 from the surface. In an exemplary embodiment, the power generation system 56 operates on an open-loop system in which the drilling fluid 60 functions as the power fluid 62 during drilling operations. In another exemplary embodiment, the power generation system 56 operates on a closed-loop system in which the power fluid 62 is isolated from the drilling fluid 60 during drilling operations. Although FIG. 1 depicts the power generation system 56 located above the rotary steerable drilling tool 48, the mud motor 50, the logging tools 52, and telemetry system 54 in the bottom-hole assembly 44, the power generation system 56 may alternately be located elsewhere in the bottom-hole assembly 44. The structure and operation of the power generation system 56 will be discussed in further detail below. Further, although the power generation system 56 has been herein disclosed as part of the bottom-hole assembly 44, the power generation system 56 is equally well suited to provide mechanical, hydraulic, and/or electrical power to other downhole tools and systems such as, for example, an artificial lift system.

Although FIG. 1 depicts a horizontal wellbore, it should be understood by those skilled in the art that the illustrative embodiments of the present disclosure are equally well suited for use in wellbores having other orientations including vertical wellbores, slanted wellbores, multilateral wellbores or the like. Accordingly, it should be understood by those skilled in the art that the use of directional terms such as "above," "below," "upper," "lower," "upward," "downward," "uphole," "downhole" and the like are used in relation to the illustrative embodiments as they are depicted in the figures, the upward direction being toward the top of the corresponding figure and the downward direction being toward the bottom of the corresponding figure, the uphole direction being toward the surface of the well, the downhole direction being toward the toe of the well. Also, even though FIG. 1 depicts an offshore operation, it should be understood by those skilled in the art that the illustrative embodiments of the present disclosure are equally well suited for use in onshore operations. Further, even though FIG. 1 depicts a cased hole completion, it should be understood that the illustrative embodiments of the present disclosure are equally well suited for use in open hole completions.

Figure 2B:
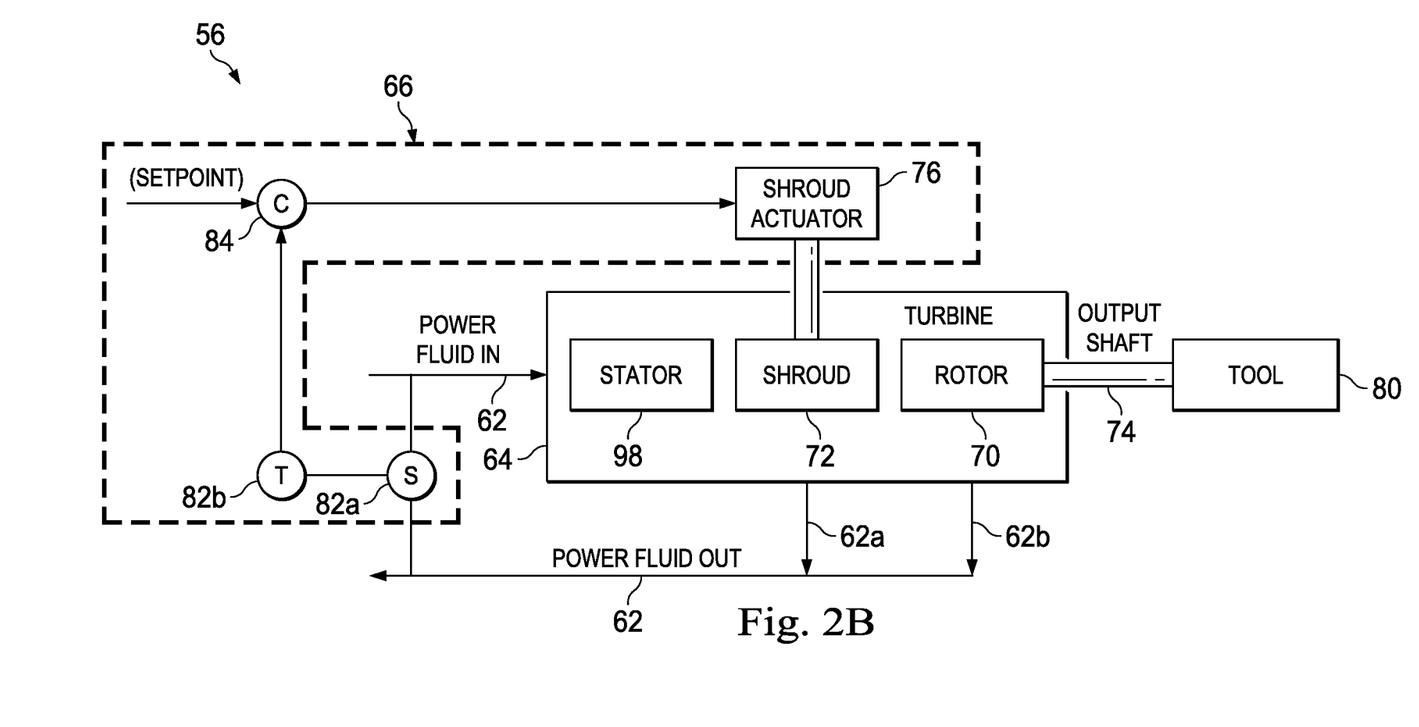
FIG. 2B is a block diagram of the power generation system of FIG. 1, the power generation system including a turbine and a feedback control loop, according to an exemplary embodiment.

In an exemplary embodiment, as illustrated in FIGS. 2A and 2B with continuing reference to FIG. 1, the power generation system 56 includes a turbine 64 and a feedback control system 66. The turbine 64 includes a rotor 70 and a shroud 72. Further, the turbine 64 is adapted to receive the power fluid 62 from the surface, at least a portion of which is communicated to the rotor 70. The rotor 70 is connected to an output shaft 74. The power fluid 62 imparts rotation to the rotor 70, which, in turn, imparts torque to the output shaft 74. The shroud 72 is connected to a shroud actuator 76, which is capable of axially displacing the shroud 72 relative to the rotor 70, thereby adjusting the proportion of the power fluid 62 that is communicated to the rotor 70. The shroud 72 and the shroud actuator 76 are thus together operable to divide the power fluid 62 into a bypass fluid portion 62a, which is not communicated to the rotor 70, and a rotor fluid portion 62b, which is communicated to the rotor 70. Further, axial displacement of the shroud 72 by the shroud actuator 76 effectively adjusts the proportion of the bypass fluid portion 62a in relation to the rotor fluid portion 62b. In this manner, when the power fluid 62 is communicated to the turbine 64, the shroud actuator 76 is operable to adjust the torque of the output shaft 74 at a given flow rate of the power fluid 62. Alternatively, the shroud actuator 76 is operable to maintain, as far as possible, the torque of the output shaft 74 as the flow rate of the power fluid 62 varies.

Figure 2C:
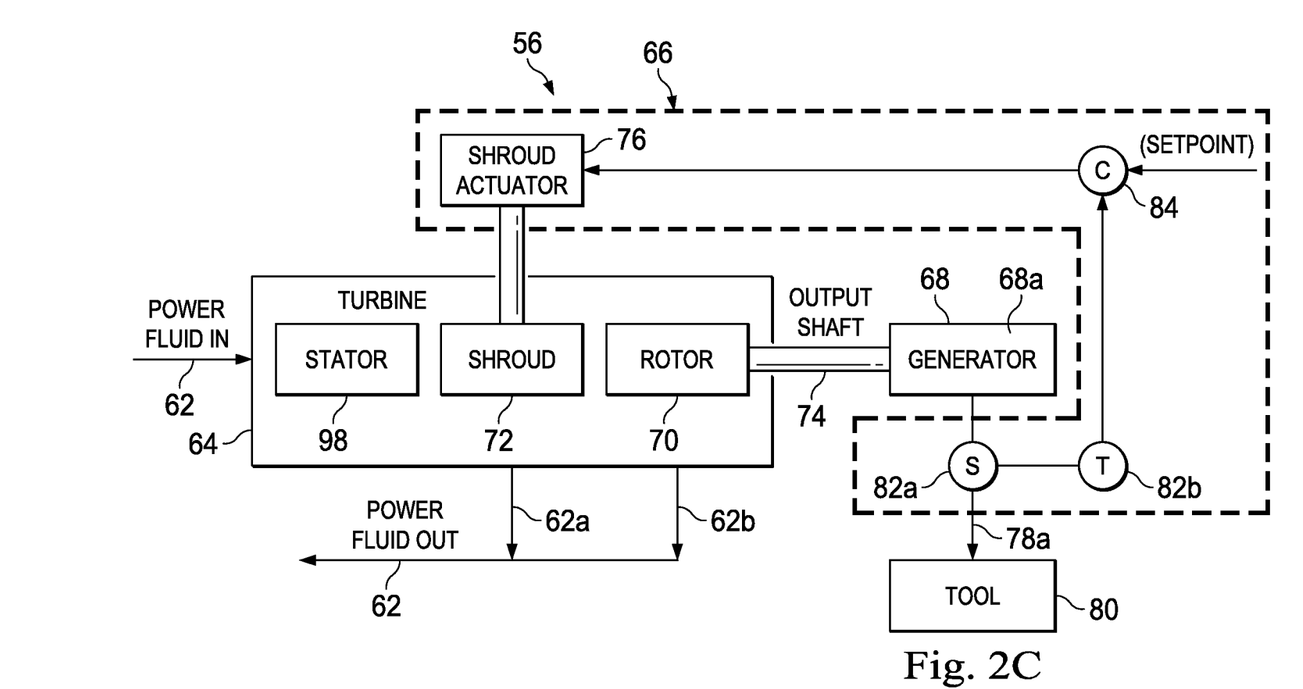
FIG. 2C is a block diagram of the power generation system of FIG. 1, the power generation system including a turbine, an electric generator, and a feedback control loop, according to an exemplary embodiment.
Figure 2D:
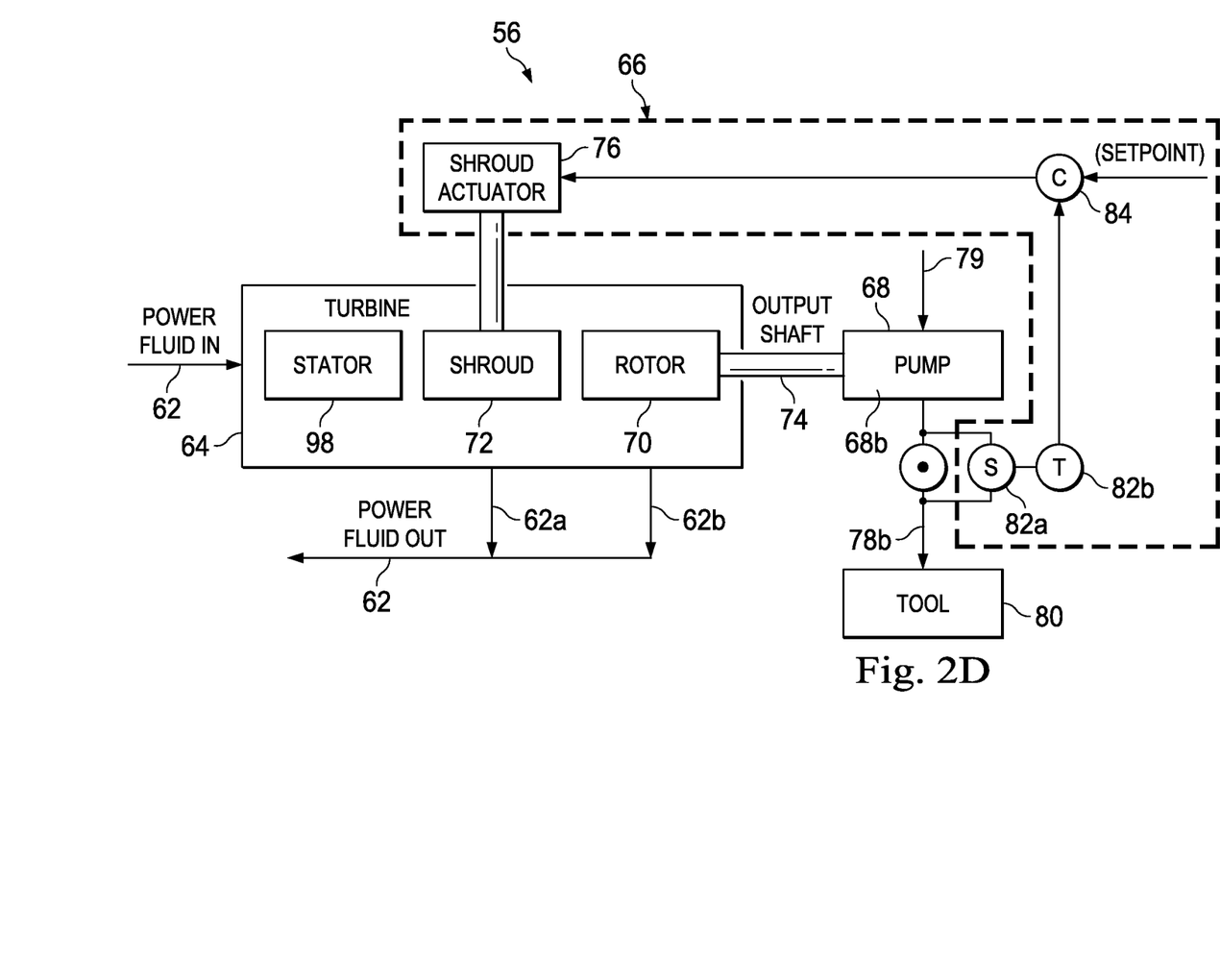
FIG. 2D is a block diagram of the power generation system of FIG. 1, the power generation system including a turbine, a pump, and a feedback control loop, according to an exemplary embodiment.

In an exemplary embodiment, as shown in FIG. 2A, the output shaft 74 is operably coupled to an auxiliary actuator 75, which may be any mechanical actuator such as, for example, a ball screw or a rack and pinion. The torque of the output shaft 74 drives the auxiliary actuator 75, which, in turn, is adapted to displace one or more components of the bottom-hole assembly 44. In an exemplary embodiment, as shown in FIGS. 2A and 2B, the torque of the output shaft 74 is used to power one or more tools 80 in the bottom-hole assembly 44. The tools 80 may include, but are not limited to, the rotary drill bit 46, the rotary steerable drilling tool 48, the mud motor 50, the logging tools 52, and/or the telemetry system 54. In several exemplary embodiments, the tools 80 also include other components of the bottom-hole assembly 44 such as, for example, the stabilizers, reamers, jarring devices, and/or hole-openers. In another exemplary embodiment, as shown in FIGS. 2C and 2D, the power generation system 56 further includes a power converter section 68. The power converter section 68 includes a generator 68a and/or a pump 68b, as shown in FIGS. 2C and 2D, respectively. In several exemplary embodiments, the output shaft 74 of the turbine 64 is coupled to the generator 68a, which converts the torque of the output shaft 74 into an electric output 78a, as shown in FIG. 2C. In several exemplary embodiments, the output shaft 74 of the turbine 64 is coupled to the pump 68b, which converts the torque of the output shaft 74 into a hydraulic output 78b, as shown in FIG. 2D. Specifically, the suction end of the pump 68b draws upon a hydraulic fluid 79, which fluid, in turn, is subsequently discharged from the pump 68b as the hydraulic output 78b. The electric output 78a and/or the hydraulic output 78b are used to power the one or more tools 80 in the bottom-hole assembly 44.

As shown in FIGS. 2A-2D, the feedback control system 66 monitors and controls the torque of the output shaft 74, the electric output 78a of the electric generator 68a, and/or the hydraulic output 78b of the pump 68b. The feedback control system 66 includes a sensor 82a, a transmitter 82b, and a controller 84. In several exemplary embodiments, the feedback control system 66 also includes the shroud actuator 76. The sensor 82a monitors at least one of: the torque of the output shaft 74 via, for example, the position or velocity of the auxiliary actuator 75 (shown in FIG. 2A), the pressure differential between the power fluid 62 received and discharged by the turbine 64 (shown in FIG. 2B), the electric output 78a of the electric generator 68a (shown in FIG. 2C), and/or the hydraulic output 78b of the pump 68b (shown in FIG. 2D). The transmitter 82b communicates the data monitored by the sensor 82a to the controller 84. The controller 84, in turn, communicates a signal to the shroud actuator 76. The operation of the feedback control system 66 will be discussed in further detail below.

Figure 3A:
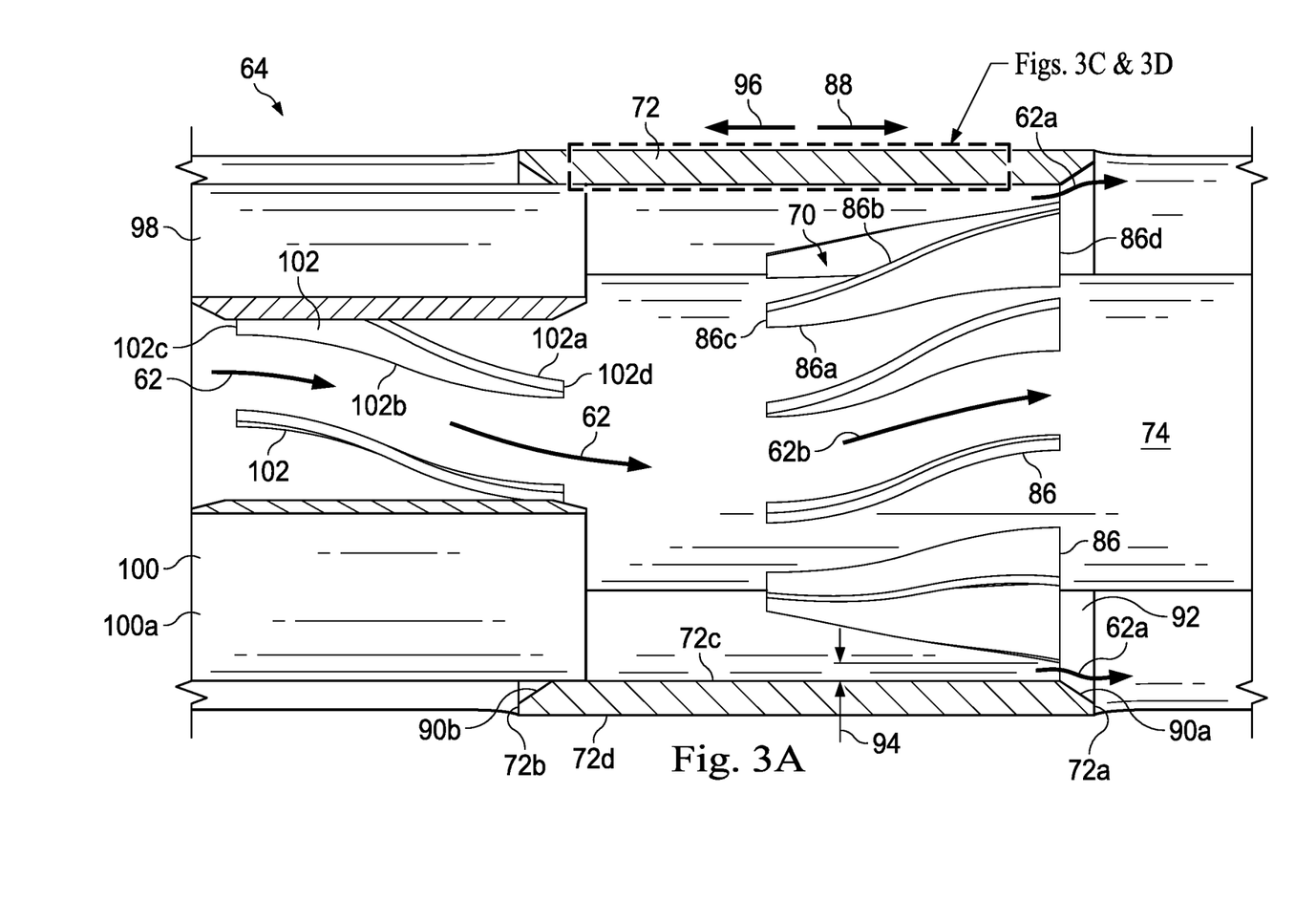
FIG. 3A is a sectional view of the turbine of FIGS. 2A and 2B, the turbine including a shaft, a rotor, a shroud, and a bypass gap, the shroud being axially displaced to reduce the size of the bypass gap, according to an exemplary embodiment.
Figure 3B:
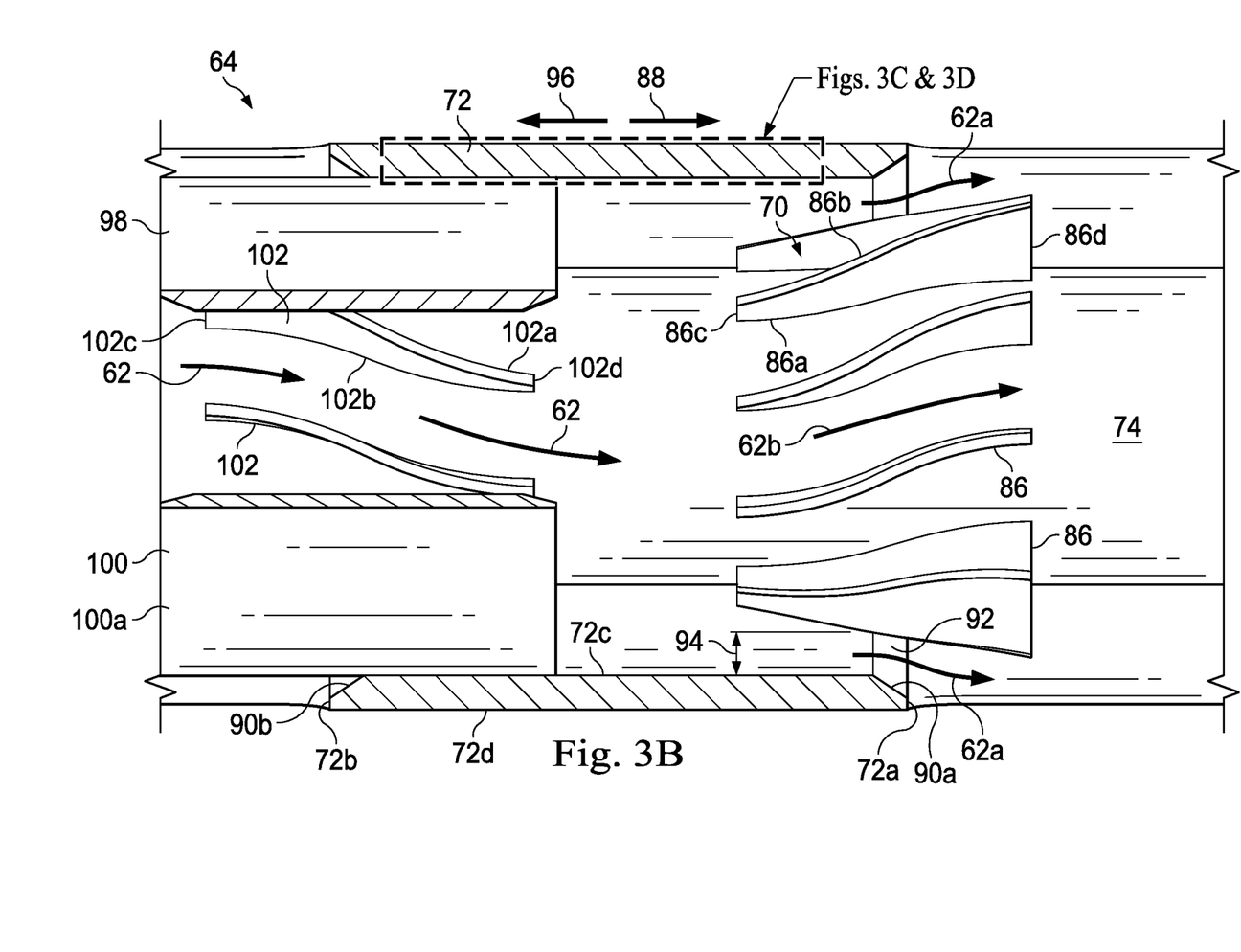
FIG. 3B is a sectional view of the turbine of FIG. 3A, the shroud being axially displaced to increase the size of the bypass gap, according to an exemplary embodiment.

In an exemplary embodiment of the turbine 64, as illustrated in FIGS. 3A and 3B with continuing reference to FIGS. 1 and 2A-2D, the rotor 70 and the output shaft 74 each extend within the shroud 72, which is generally tubular in shape. The rotor 70 includes a plurality of blades 86, each defining a proximal portion 86a and a distal portion 86b. The proximal portion 86a of each of the blades 86 is connected to the output shaft 74. Alternatively, the proximal portions 86a may be connected to a tubular member (not shown), which tubular member, in turn, is connected to the output shaft 74. The distal portion 86b of each of the blades 86 extends radially outward from the output shaft 74. Each of the plurality of blades 86 further defines a leading edge 86c and a trailing edge 86d. The leading edges 86c are adapted to receive the power fluid 62 from the surface in an axial direction 88. Each of the plurality of blades 86 extends spirally from the leading edge 86c to the trailing edge 86d thereof. In an exemplary embodiment, as shown in FIGS. 3A and 3B, each of the plurality of blades 86 is tapered such that the distance between the proximal portion 86a and the distal portion 86b is lesser at the leading edge 86c than at the trailing edge 86d. In another exemplary embodiment, the plurality of blades 86 are not tapered, i.e., the distance between the proximal portion 86a and the distal portion 86b remains constant from the leading edge 86c to the trailing edge 86d. As the power fluid 62 flows along the plurality of blades 86 from the respective leading edges 86c to the respective trailing edges 86d thereof, the power fluid 62 imparts torque to the rotor 70 and, consequently, to the output shaft 74. The rotor fluid portion 62b of the power fluid 62, i.e., the portion of the power fluid 62 that is communicated to the rotor 70, is ejected from the trailing edges 86d of the plurality of blades 86 and communicated back to the surface.

Figure 3C:
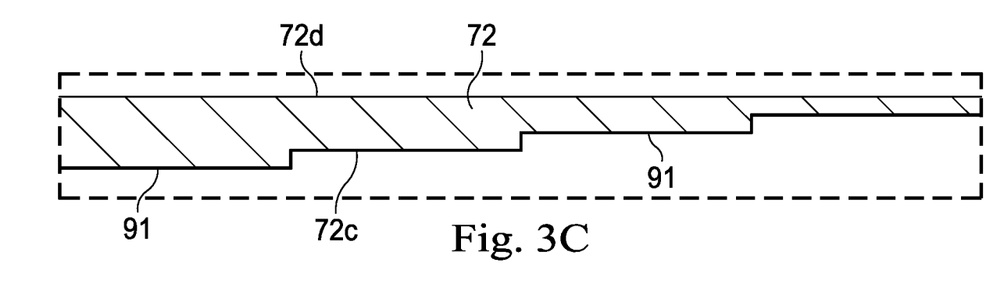
FIG. 3C is an enlarged view of a portion of FIG. 3A, illustrating an alternative embodiment of the shroud, according to an exemplary embodiment.

The shroud 72 extends circumferentially about the output shaft 74 and the rotor 70, thereby defining opposing end portions 72a, 72b, an interior surface 72c, and an exterior surface 72d. In some embodiments where the plurality of blades 86 are tapered, as shown in FIGS. 3A and 3B, the diameter of the interior surface 72c remains constant from the end portion 72a to the end portion 72b thereof. However, in some embodiments where the plurality of blades 86 are not tapered, the interior surface 72c of the shroud 72 is tapered such that the diameter thereof varies from the end portion 72a to the end portion 72b. Furthermore, in several exemplary embodiments, the diameter of the interior surface 72c of the shroud 72 may be varied from the end portion 72a to the end portion 72b via a plurality of steps 91, as shown in FIG. 3C. As shown in FIGS. 3A and 3B, chamfered surfaces 90a, 90b are formed on the interior surface 72c of the shroud 72 at the respective opposing end portions 72a, 72b thereof. The chamfered surface 90a of the shroud 72 further defines a circumferentially-extending lip 92. A bypass gap 94 is defined between the circumferentially-extending lip 92 and the adjacent distal portions 86b of the plurality of blades 86. In an exemplary embodiment, the chamfered surfaces 90a, 90b are omitted and the bypass gap 94 is instead defined between the distal portions 86b of the plurality of blades 86 and the interior surface 72c of the shroud 72. The bypass fluid portion 62a of the power fluid 62, i.e., the portion of the power fluid 62 that is not communicated to the rotor 70, passes through the bypass gap 94 and past the circumferentially-extending lip 92 before it is communicated back to the surface. The chamfered surface 90a of the shroud 72 promotes reduced turbulence in the bypass fluid portion 62a after it flows past the circumferentially-extending lip 92 of the shroud 72. As discussed above, the shroud 72 is adapted to be axially moveable in relation to the rotor 70.

The shroud actuator 76 (shown in FIGS. 2A and 2B) is adapted to axially displace the shroud 72 relative to the plurality of blades 86, which displacement effectively adjusts the size of the bypass gap 94. Specifically, the size of the bypass gap 94 is decreased when the circumferentially-extending lip 92 is displaced in the direction 88, closer to the respective trailing edges 86d of the plurality of blades 86, as shown in FIG. 3A. Conversely, the size of the bypass gap 94 is increased when the circumferentially-extending lip 92 is displaced in a direction 96, which is opposite the direction 88, farther away from the respective trailing edges 86d of the plurality of blades 86, as shown in FIG. 3B. Thus, as discussed above, the shroud 72 and the shroud actuator 76 are together operable to divide the power fluid 62 into the bypass fluid portion 62a, which passes through the bypass gap 94 and is not communicated to the rotor 70, and the rotor fluid portion 62b, which is communicated to the rotor 70 and does not pass through the bypass gap 94. In this manner, the shroud actuator 76 is operable to adjust the torque of the output shaft 74 by adjusting the proportion of the power fluid 62 that is communicated to the rotor 70 at a given flow rate. Alternatively, the shroud actuator 76 is operable to maintain, as far as possible, the torque of the output shaft 74 as the flow rate of the power fluid 62 is varied. Thus, the torque of the rotor 70 and, consequently, the output shaft 74, can be manipulated by axially displacing the shroud 72 via the shroud actuator 76 (shown in FIGS. 2A and 2B). In several exemplary embodiments, the shroud actuator 76 includes a mechanical, hydraulic, and/or electrical power source coupled to a ball screw, a rack and pinion, a hydraulic cylinder, a pair of opposing magnets, a solenoid, another mechanical, electrical, or hydraulic actuator, or any combination thereof. In an exemplary embodiment, the shroud actuator 76 includes a spring return (not shown), which applies a biasing force to the shroud 72.

Figure 3D:
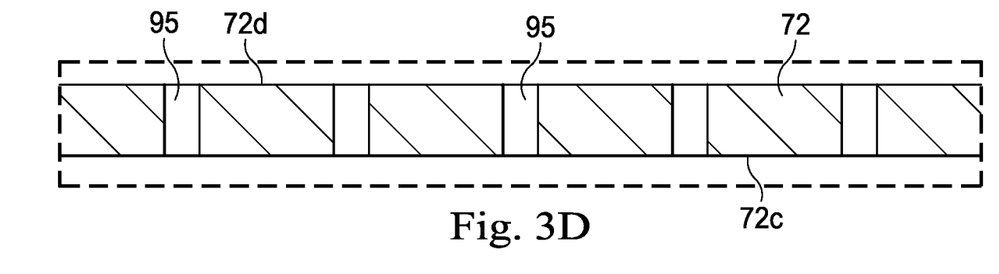
FIG. 3D is an enlarged view of a portion of FIG. 3A, illustrating another alternative embodiment of the shroud, according to an exemplary embodiment.

In an exemplary embodiment, the shroud actuator 76 is adapted to helically displace the shroud 72 relative to the plurality of blades 86. In several exemplary embodiments, rather than axially displacing the shroud 72 relative to the rotor 70, the shroud actuator 76 is adapted to axially displace the rotor 70 relative to the shroud 72. In several exemplary embodiments, the bypass gap 94 is at least partially defined by a plurality of bypass openings 95 formed through the shroud 72, as shown in FIG. 3D. A portion of the bypass fluid portion 62a of the power fluid 62 may be communicated through the bypass openings 95. Consequently, such portion is not communicated to the rotor 70. The portion of the bypass fluid portion 62a communicated through the bypass openings 95 is dependent upon the axial position of the shroud 72. As a result, the axial displacement of the shroud 72 adjusts the quantity and/or size of the bypass openings 95 through which the power fluid 62 may be communicated before the power fluid 62 is communicated to the rotor 70.

As shown in FIGS. 2A-2D, 3A, and 3B, the turbine 64 further includes a stator 98 extending circumferentially about the output shaft 74. The stator 98 is adapted to direct the flow of the power fluid 62 to the rotor 70. Specifically, the stator 98 causes the power fluid 62 to flow spirally in the axial direction 88, thereby increasing the amount of lift imparted to the plurality of blades 86 of the rotor 70 by the power fluid 62. The stator 98 does not rotate in relation to the drill string 36, even as the power fluid 62 imparts rotation to the rotor 70 and, consequently, the output shaft 74. The stator 98 includes a housing 100 and a plurality of vanes 102, each defining a proximal portion 102a and a distal portion 102b. The housing 100 includes a tubular member 100a extending circumferentially about the output shaft 74. The proximal portion 102a of each of the vanes 102 is connected to the tubular member 100a. The distal portion 102b of each of the vanes 102 extends radially inward from the tubular member 100a toward the output shaft 74. In an exemplary embodiment, the housing further includes a tubular member (not shown), to which the respective distal portions 102b of the plurality of vanes 102 are connected. Each of the vanes 102 further defines a leading edge 102c and a trailing edge 102d. The leading edge 102c of each of the vanes 102 is adapted to receive the power fluid 62 from the surface in the axial direction 88. Each of the plurality of vanes 102 extends spirally from the leading edge 102c to the trailing edge 102d thereof. As the power fluid 62 flows along the plurality of vanes 102 from the respective leading edges 102c to the respective trailing edges 102c thereof, the plurality of vanes 102 imparts a spiral flow to the power fluid 62 in the axial direction 88. As discussed above, the spiral flow of the power fluid 62 from the stator 98 to the rotor 70 increases the amount of lift imparted to the plurality of blades 86.

Figure 4:
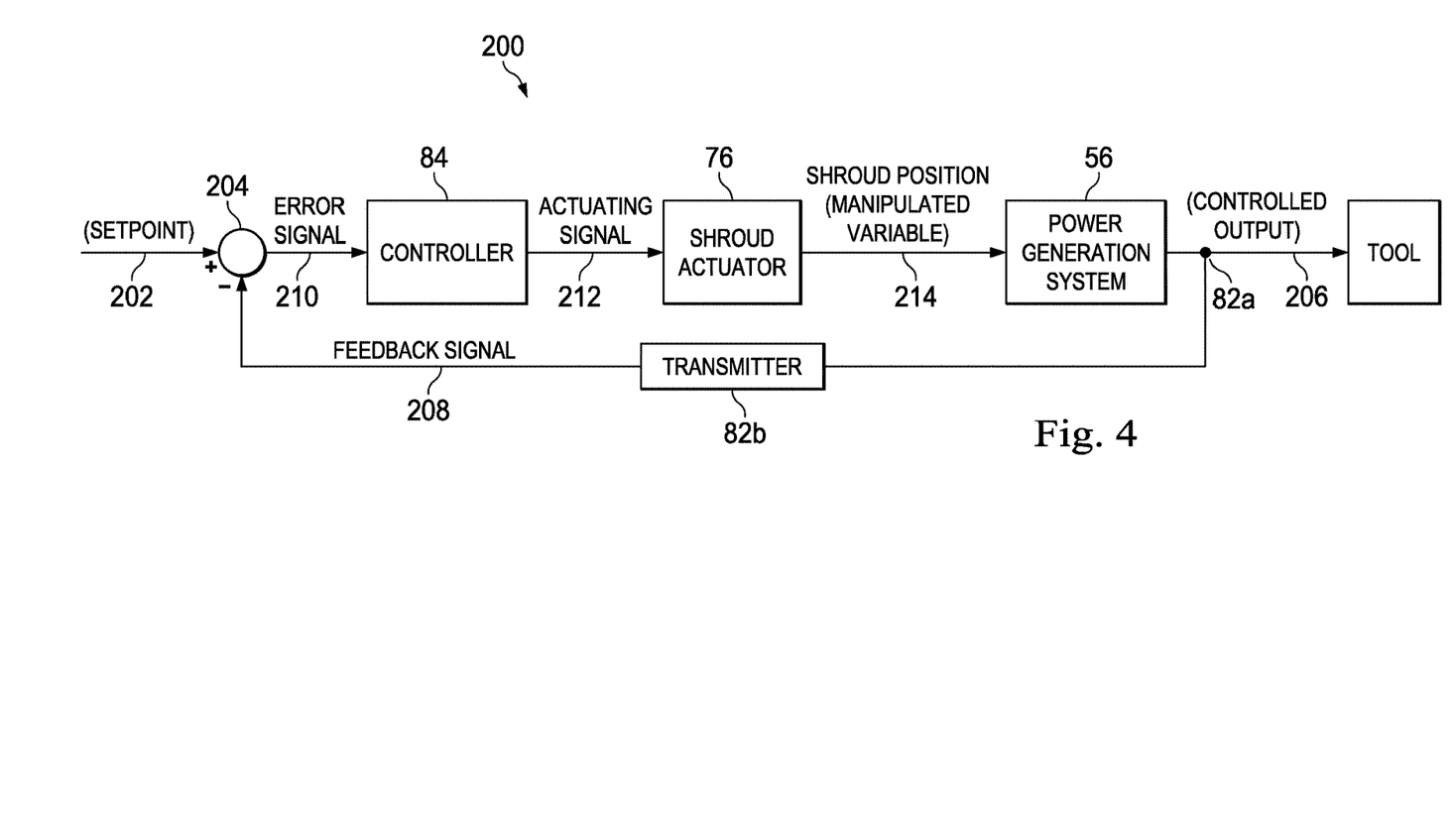
FIG. 4 is a block diagram of a feedback control loop executed by the feedback control loop of FIGS. 2A and 2B, according to an exemplary embodiment.

In an exemplary embodiment, as illustrated in FIG. 4 with continuing reference to FIGS. 1, 2A, 2B, 3A and 3B, the feedback control system 66, including the sensor 82a, the transmitter 82b, and the controller 84, is operable to execute a feedback control loop, which is generally referred to by the reference numeral 200. The feedback control loop 200 is initiated when a setpoint 202 is communicated to a comparator 204. The setpoint 202 relates to the desired value for a controlled output 206 of the power generation system 56. The comparator 204 compares the setpoint 202 with a feedback signal 208 received from the transmitter 82b. The feedback signal 208 represents the controlled output 206 of the power generation system 56. After comparing the setpoint 202 with the feedback signal 208, the comparator 204 communicates an error signal 210 to the controller 84. The error signal 210 represents the difference between the setpoint 202 and the feedback signal 208. The controller 84, in turn, communicates an actuating signal 212 to the shroud actuator 76. The actuating signal 212 represents an action to be taken by the shroud actuator 76 in order to bring the controlled output 206 closer to the setpoint 202. Specifically, the actuating signal causes the shroud actuator 76 to axially displace the shroud 72—the shroud actuator 76 adjusts a manipulated variable 214, i.e., the position of the shroud 72, based on the actuating signal 212. Adjusting the manipulated variable 214 adjusts the controlled output 206 of the power generation system 56, which output, in turn, is communicated back to the comparator 204 by the sensor 82a and the transmitter 82b via the feedback signal 208. In this manner, the feedback control system 66 is operable to bring the controlled output 208 closer to the setpoint 202 by executing the feedback control loop 200 repeatedly.

As discussed above, the setpoint 202 relates to the desired value for the controlled output 206 of the power generation system 56. In some exemplary embodiments, the controlled output 206 is the torque of the output shaft 74 which can be measured, for example, via the position and/or velocity of the auxiliary actuator 75 (shown in FIG. 2A). In some exemplary embodiments, the controlled output 206 is the pressure differential between the power fluid 62 received and discharged by the turbine 64 (shown in FIG. 2B). In some exemplary embodiments, the controlled output 206 is a specific characteristic of the electric output 78a of the generator 68a such as, for example, the current, voltage, and/or frequency of the electric output 78a (shown in FIG. 2C). In some exemplary embodiments, the controlled output 206 is a specific characteristic of the hydraulic output 78b of the pump 68b such as, for example, the pressure and/or flow of the hydraulic output 78b (shown in FIG. 2D). Furthermore, by controlling any one of: the pressure differential between the power fluid 62 received and discharged by the turbine 64, the electric output 78a of the generator 68a, and the hydraulic output 78b of the pump 68b, the feedback control system 66 is capable of controlling the torque of the rotor 70 and, consequently, the output shaft 74.

In an exemplary embodiment, increasing the flow rate of the power fluid 62 increases the torque and/or angular velocity of the rotor 70 and the output shaft 74. The torque of the rotor 70 and the output shaft 74 can be maintained, even as the flow rate of the power fluid 62 increases, by displacing the shroud 72 in the direction 96 (shown in FIG. 3B). Conversely, the torque of the rotor 70 and the output shaft 74 can be maintained, even as the flow rate of the power fluid 62 decreases, by displacing the shroud 72 in the direction 88 (shown in FIG. 3A). In an exemplary embodiment, the power generation system 56 increases the operational range of the turbine 64, thereby increasing the operational range of the one or more tools 80. In an exemplary embodiment, the power generation system 56 increases the life of the turbine 64 by allowing for effective monitoring of overspeed and stall conditions experienced by the rotor 70. As a result, the power generation system 56 allows for an increased flow range of the power fluid 62.

The present disclosure introduces a power generation system comprising a rotor to which a first portion of a power fluid is communicated, the first portion of the power fluid imparting a torque to the rotor; a shaft to which the rotor is connected; a shroud extending circumferentially about the rotor and the shaft; a bypass gap defined between the rotor and the shroud, the bypass gap communicating a second portion of the power fluid therethrough; and a feedback control system that displaces the shroud axially relative to the rotor; wherein displacement of the shroud axially relative to the rotor adjusts the size of the bypass gap and, consequently, the ratio of the first portion of the power fluid relative to the second portion of the power fluid. In an exemplary embodiment, the rotor comprises a plurality of blades extending radially outward from the shaft, each blade defining a proximal portion, a distal portion, a leading edge, and a trailing edge; and each of the plurality of blades is tapered so that a length of the blade from the proximal portion to the distal portion is smaller at the leading edge than at the trailing edge. In an exemplary embodiment, the proximal portion of each of the blades is connected to the shaft; and each of the plurality of blades extends spirally from the leading edge to the trailing edge thereof. In an exemplary embodiment, the shroud is generally tubular and defines first and second end portions, the interior of the shroud varying in diameter from the first end portion to the second end portion thereof; and the bypass gap is defined between the interior of the shroud and the respective distal portions of the blades. In an exemplary embodiment, the interior diameter of the shroud varies in steps from the first end portion to the second end portion thereof. In an exemplary embodiment, the bypass gap is at least partially defined by a plurality of bypass openings formed through the shroud; a third portion of the power fluid is communicated through the bypass openings; and displacement of the shroud axially relative to the rotor adjusts the quantity and/or size of the bypass openings through which the third portion of the power fluid may be communicated and, consequently, the ratio of the third portion relative to the first portion. In an exemplary embodiment, the feedback control system comprises a shroud actuator connected to the shroud to axially displace the shroud relative to the rotor; one or more sensors that communicate a first signal; a transmitter that receives the first signal from the one or more sensors and communicates a second signal; and a controller that receives the second signal from the transmitter, receives a third signal, and communicates a fourth signal to the shroud actuator. In an exemplary embodiment, the first and second signals correspond to an output of the power generation system; the third signal corresponds to a setpoint for the output of the power generation system; and the fourth signal causes the shroud actuator to axially displace the shroud to adjust the output of the power generation system closer to the setpoint. In an exemplary embodiment, the output of the power generation system is the torque of the shaft; and each of the one or more sensors monitors the torque of the shaft. In an exemplary embodiment, the power generation system further comprises an electric generator connected to the shaft to convert the torque and velocity of the shaft into an electric output; wherein the output of the power generation system is the electric output of the electric generator; and wherein each of the one or more sensors monitors the electric output of the electric generator. In an exemplary embodiment, the power generation system further comprises a pump connected to the shaft to convert the torque of the shaft into a hydraulic output; wherein the output of the power generation system is the hydraulic output of the pump; and wherein each of the one or more sensors monitors the hydraulic output of the pump.

The present disclosure also introduces a method for controlling an output of a power generation system, the method comprising providing the power generation system including a shaft, a rotor connected to the shaft, a shroud extending circumferentially about the rotor and the shaft, and a bypass gap defined between the rotor and the interior of the shroud; communicating a first portion of a power fluid to the rotor, the first portion of the power fluid imparting a torque to the rotor and the shaft; communicating a second portion of the power fluid through the bypass gap; monitoring the output of the power generation system; and axially displacing the shroud relative to the rotor to adjust the size of the bypass gap and, consequently, the ratio of the first portion relative to the second portion. In an exemplary embodiment, the rotor comprises a plurality of blades extending radially outward from the shaft, each blade defining a proximal portion, a distal portion, a leading edge, and a trailing edge; and each of the plurality of blades is tapered so that a length of the blade from the proximal portion to the distal portion is smaller at the leading edge than at the trailing edge. In an exemplary embodiment, the proximal portion of each of the blades is connected to the shaft; and each of the plurality of blades extends spirally from the leading edge to the trailing edge thereof. In an exemplary embodiment, the shroud is generally tubular and defines first and second end portions, the interior of the shroud varying in diameter from the first end portion to the second end portion thereof; and the bypass gap is defined between the interior of the shroud and the respective distal portions of the blades. In an exemplary embodiment, the interior diameter of the shroud varies in steps from the first end portion to the second end portion thereof. In an exemplary embodiment, the bypass gap is at least partially defined by a plurality of bypass openings formed through the shroud; the method further comprises communicating a third portion of the power fluid through the bypass openings; and axially displacing the shroud relative to the rotor adjusts the quantity and/or size of the bypass openings through which the third portion of the power fluid may be communicated and, consequently, the ratio of the third portion relative to the first portion. In an exemplary embodiment, the output of the power generation system is monitored with a feedback control system, the feedback control system comprising an actuator connected to the shroud, wherein the actuator displaces the shroud axially relative to the rotor; one or more sensors, wherein the one or more sensors monitor the output of the power generation system; a transmitter in communication with the one or more sensors; and a controller in communication with the transmitter and the actuator. In an exemplary embodiment, axially displacing the shroud relative to the rotor to adjust the size of the bypass gap comprises receiving, with the transmitter, a first signal from the one or more sensors, the first signal corresponding to the output of the power generation system; transmitting, with the transmitter, a second signal to the controller, the second signal corresponding to the first signal; receiving and comparing, with the controller, the second signal and a third signal, the third signal corresponding to a setpoint for the output of the power generation system; and transmitting, with the controller, a fourth signal to the actuator, the fourth signal causing the actuator to displace the shroud axially to adjust the output of the power generation system closer to the setpoint. In an exemplary embodiment, the output of the power generation system is the torque of the shaft; and each of the one or more sensors monitors the torque of the shaft. In an exemplary embodiment, the power generation system further comprises an electric generator connected to the shaft to convert the torque and velocity of the shaft into an electric output; wherein the output of the power generation system is the electric output of the electric generator; and wherein each of the one or more sensors monitors the electric output of the electric generator. In an exemplary embodiment, the power generation system further comprises a pump connected to the shaft to convert the torque of the shaft into a hydraulic output; wherein the output of the power generation system is the hydraulic output of the pump; and wherein each of the one or more sensors monitors the hydraulic output of the pump.

The present disclosure also introduces a method for controlling an output of a turbine, the method comprising providing a turbine including a shaft, a rotor connected to the shaft, a shroud extending about the rotor so that a bypass gap is defined between the shroud and the rotor, and an actuator connected to the shroud to axially displace the shroud relative to the rotor; communicating a fluid to the turbine, the fluid comprising a first portion communicated to the rotor and a second portion communicated to the bypass gap, the first portion of the fluid imparting a torque to the rotor; monitoring an output of the turbine with one or more sensors; transmitting, with a transmitter, a first signal representing the output of the turbine, as monitored by the one or more sensors, to a controller; communicating a second signal to the controller, the second signal representing a setpoint for the output of the turbine; communicating a third signal, based on the first and second signals, from the controller to the actuator, the third signal causing the actuator to displace the shroud axially. In an exemplary embodiment, displacing the shroud axially changes the size of the bypass gap and, consequently, the ratio of the first portion relative to the second portion of the fluid, so that the output of the turbine is adjusted closer to the setpoint. In an exemplary embodiment, the method further comprises providing an electric generator connected to the shaft to convert the torque of the shaft into an electric output; and the output of the turbine comprises at least one of: the torque of the shaft and the electric output of the generator. In an exemplary embodiment, the method further comprises providing a pump connected to the shaft to convert the torque of the shaft into a hydraulic output; and the output of the turbine comprises at least one of: the torque of the shaft and the hydraulic output of the pump.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

Although several exemplary embodiments have been disclosed in detail above, the embodiments disclosed are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A power generation system comprising:
   a shaft;
   a rotor connected to the shaft and adapted to receive a first portion of a power fluid, which first portion of the power fluid imparts rotation to the rotor and the shaft;
   a shroud extending circumferentially about the rotor and the shaft;
   a bypass gap defined between the rotor and the shroud, the bypass gap being adapted to communicate a second portion of the power fluid therethrough; and
   a feedback control system adapted to displace the shroud axially relative to the rotor;
   wherein displacement of the shroud axially relative to the rotor adjusts a size of the bypass gap and, consequently, a ratio of the first portion of the power fluid relative to the second portion of the power fluid;
   wherein the feedback control system comprises:
     a shroud actuator connected to the shroud and adapted to axially displace the shroud relative to the rotor;
     a sensor adapted to detect an output of the power generation system; and
     a controller adapted to control the shroud actuator, based on an output setpoint and the detected output of the power generation system, to axially displace the shroud causing the output of the power generation system to be adjusted closer to the output setpoint;
   and
   wherein:
   (i) the output of the power generation system is rotation of the shaft; and
     the sensor is adapted to detect the rotation of the shaft;
   (ii) the power generation system further comprises an electric generator connected to the shaft and adapted to convert the rotation of the shaft into an electric output;
     the output of the power generation system is the electric output of the electric generator; and
     the sensor is adapted to detect the electric output of the electric generator;
   (iii) the power generation system further comprises a pump connected to the shaft and adapted to convert the rotation of the shaft into a hydraulic output;
     the output of the power generation system is the hydraulic output of the pump; and
     the sensor is adapted to detect the hydraulic output of the pump;
   or
   (iv) any combination of (i), (ii), and (iii).

2. The power generation system as recited in claim 1,
   wherein the rotor comprises a plurality of blades extending radially outward from the shaft, each blade defining a proximal portion, a distal portion, a leading edge, and a trailing edge; and
   wherein each of the plurality of blades is tapered so that a length of the blade from the proximal portion to the distal portion is smaller at the leading edge than at the trailing edge.

3. The power generation system as recited in claim 2,
   wherein the proximal portion of each of the blades is connected to the shaft; and
   wherein each of the plurality of blades extends spirally from the leading edge to the trailing edge thereof.

4. The power generation system as recited in claim 2,
   wherein the shroud is generally tubular and defines first and second end portions, an interior of the shroud varying in diameter from the first end portion to the second end portion thereof; and
   wherein the bypass gap is defined between the interior of the shroud and the respective distal portions of the blades.

5. The power generation system as recited in claim 3, wherein the interior diameter of the shroud varies in steps from the first end portion to the second end portion thereof.

6. The power generation system as recited in claim 1,
   wherein the bypass gap is at least partially defined by a plurality of bypass openings formed through the shroud;
   wherein a third portion of the power fluid is communicated through the bypass openings; and
   wherein displacement of the shroud axially relative to the rotor adjusts a quantity and/or size of the bypass openings through which the third portion of the power fluid may be communicated and, consequently, a ratio of the third portion relative to the first portion.

7. The power generation system as recited in claim 1,
   wherein the sensor communicates a first signal;
   wherein the feedback control system further comprises a transmitter that receives the first signal from the sensor and communicates a second signal; and
   wherein the controller receives the second signal from the transmitter, receives a third signal, and communicates a fourth signal to the shroud actuator.

8. The power generation system as recited in claim 7,
   wherein the first and second signals correspond to the output of the power generation system;
   wherein the third signal corresponds to the output setpoint for the output of the power generation system; and
   wherein the fourth signal causes the shroud actuator to axially displace the shroud to adjust the output of the power generation system closer to the output setpoint.

9. A method for comprising:
   communicating a first portion of a power fluid to a rotor, the rotor being connected to a shaft of a power generation system, the first portion of the power fluid imparting rotation to the rotor and the shaft;

communicating a second portion of the power fluid through a bypass gap defined between the rotor and a shroud that extends circumferentially about the rotor and the shaft;

detecting, using a sensor, an output of the power generation system;

axially displacing, using an actuator connected to the shroud, the shroud relative to the rotor to adjust a size of the bypass gap and, consequently, a ratio of the first portion relative to the second portion; and controlling, using a controller and based on an output setpoint and the detected output of the power generation system, the axial displacement of the shroud causing the output of the power generation system to be adjusted closer to the output setpoint;

wherein:

(i) the output of the power generation system is the rotation of the shaft; and the sensor detects the rotation of the shaft;

(ii) the power generation system further comprises an electric generator connected to the shaft to convert the rotation of the shaft into an electric output;

the output of the power generation system is the electric output of the electric generator; and the sensor detects the electric output of the electric generator;

(iii) the power generation system further comprises a pump connected to the shaft to convert the rotation of the shaft into a hydraulic output;

the output of the power generation system is the hydraulic output of the pump; and the sensor detects the hydraulic output of the pump; or (iv) any combination of (i), (ii), and (iii).

10. The method as recited in claim 9, wherein the rotor comprises a plurality of blades extending radially outward from the shaft, each blade defining a proximal portion, a distal portion, a leading edge, and a trailing edge; and wherein each of the plurality of blades is tapered so that a length of the blade from the proximal portion to the distal portion is smaller at the leading edge than at the trailing edge.

11. The method as recited in claim 10, wherein the proximal portion of each of the blades is connected to the shaft; and wherein each of the plurality of blades extends spirally from the leading edge to the trailing edge thereof.

12. The method as recited in claim 10, wherein the shroud is generally tubular and defines first and second end portions, an interior of the shroud varying in diameter from the first end portion to the second end portion thereof; and wherein the bypass gap is defined between the interior of the shroud and the respective distal portions of the blades.

13. The method as recited in claim 11, wherein the interior diameter of the shroud varies in steps from the first end portion to the second end portion thereof.

14. The method as recited in claim 9, wherein the bypass gap is at least partially defined by a plurality of bypass openings formed through the shroud;

wherein the method further comprises communicating a third portion of the power fluid through the bypass openings; and wherein axially displacing the shroud relative to the rotor adjusts a quantity and/or size of the bypass openings through which the third portion of the power fluid may be communicated and, consequently, a ratio of the third portion relative to the first portion.

15. The method as recited in claim 9, wherein axially displacing the shroud relative to the rotor to adjust a size of the bypass gap comprises:

receiving, with a transmitter, a first signal from the sensor, the first signal corresponding to the output of the power generation system;

transmitting, with the transmitter, a second signal to the controller, the second signal corresponding to the first signal;

receiving and comparing, with the controller, the second signal and a third signal, the third signal corresponding to the output setpoint for the output of the power generation system; and transmitting, with the controller, a fourth signal to the actuator, the fourth signal causing the actuator to displace the shroud axially to adjust the output of the power generation system closer to the output setpoint.

16. A method for controlling an output of a turbine, the method comprising:

providing a turbine including a shaft, a rotor connected to the shaft, a shroud extending about the rotor so that a bypass gap is defined between the shroud and the rotor, and an actuator connected to the shroud to axially displace the shroud relative to the rotor;

communicating a fluid to the turbine, the fluid comprising a first portion communicated to the rotor and a second portion communicated to the bypass gap, the first portion of the fluid imparting a torque to the rotor;

monitoring an output of the turbine with one or more sensors;

transmitting, with a transmitter, a first signal representing the output of the turbine, as monitored by the one or more sensors, to a controller;

communicating a second signal to the controller, the second signal representing a setpoint for the output of the turbine; and communicating a third signal, based on the first and second signals, from the controller to the actuator, the third signal causing the actuator to displace the shroud axially.

17. The method of claim 16, wherein displacing the shroud axially changes a size of the bypass gap and, consequently, a ratio of the first portion relative to the second portion of the fluid, so that the output of the turbine is adjusted closer to the setpoint.

18. The method as recited in claim 16, wherein the method further comprises providing an electric generator connected to the shaft to convert the torque of the shaft into an electric output; and wherein the output of the turbine comprises at least one of: the torque of the shaft and the electric output of the generator.

19. The method as recited in claim 16, wherein the method further comprises providing a pump connected to the shaft to convert the torque of the shaft into a hydraulic output; and wherein the output of the turbine comprises at least one of: the torque of the shaft and the hydraulic output of the pump.

* * * * *